United States Patent
Kunisetty et al.

(10) Patent No.: US 7,024,406 B1
(45) Date of Patent: Apr. 4, 2006

(54) DRIVER AND METHOD FOR PROCESSING A DATABASE STATEMENT

(75) Inventors: Sunil Kunisetty, Fremont, CA (US); Prabha Krishna, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 433 days.

(21) Appl. No.: 10/153,642

(22) Filed: May 24, 2002

Related U.S. Application Data

(60) Provisional application No. 60/294,559, filed on Jun. 1, 2001.

(51) Int. Cl.
*G06F 17/30* (2006.01)
(52) U.S. Cl. .................. 707/4; 707/2; 707/5; 707/6
(58) Field of Classification Search .............. 707/1–10, 707/100–104.1, 200–206
See application file for complete search history.

(56) References Cited

U.S. PATENT DOCUMENTS

| | | | | |
|---|---|---|---|---|
| 6,115,703 A | * | 9/2000 | Bireley et al. | 707/2 |
| 6,134,546 A | * | 10/2000 | Bestgen et al. | 707/4 |
| 6,321,235 B1 | * | 11/2001 | Bird | 707/2 |

* cited by examiner

*Primary Examiner*—Jean M. Corrielus
*Assistant Examiner*—Isaac M. Woo
(74) *Attorney, Agent, or Firm*—Hickman Palermo Truong & Becker, LLP

(57) ABSTRACT

A method and software for processing a database statement submitted by a client application to a database system is described. A database statement is precompiled based on a string received from the client application and cached in response to a call from the client application to close the precompiled database statement. The caching may be implicit or explicit or a combination of both. With implicit caching, the precompiled statement is saved in a cache in association with the string used to precompile the database statement; with explicit caching, the precompiled statement is saved in a cache in association with a user specified key.

16 Claims, 5 Drawing Sheets

(BACKGROUND)

DRIVER AND METHOD FOR PROCESSING A DATABASE STATEMENT

RELATED APPLICATIONS

The present application claims the benefit of U.S. Provisional Patent Application Ser. No. 60/294,559 filed on Jun. 1, 2001, the contents of which are hereby incorporated by reference.

FIELD OF THE INVENTION

The present invention relates to computer systems and more particularly to a driver and method for processing a database statement.

BACKGROUND OF THE INVENTION

The popularity of the World Wide Web, the Java™ programming language, and relational database systems have jointly enabled user applications to be economically developed, distributed, and maintained anywhere throughout the world. FIG. 5 illustrates one configuration of a web-based application, whose execution is distributed between a client system 500 and a server system 510 interconnected by an Internet Protocol (IP) network. In this configuration, a web browser 501 executing at the client system 500 is responsible for presenting the application's user-interface to a user and enabling communications with a web server 511 executing on the server system 510 in accordance with the Hypertext Transfer Protocol (HTTP). The web browser 501 can also download from the web server 511 executable code 503 such as bytecodes compiled from a program developed in the Java programming language. The downloaded Java code 503 can be executed from within the web browser 501 to implement the application logic of the web-based application.

The server system 510 may also host a relational database 515, which organizes information into tables of rows and columns. A relational database server 513 is provided to receive database commands and statements that request data, e.g. in the Structured Query Language (SQL) and fetch the requested data from the tables in the relational database 515.

One source of complexity in this model is that the web-based application uses downloaded Java code 503, which is written in an object-oriented programming language, but the relational database server 513 is responsive to SQL commands, statements, and queries, which are expressed in a fourth generation language (4GL). Although it is possible to code a Java application to manipulate SQL statements directly, it is more convenient at the application programming level to let a library do all this processing and simply let the application programmer to work with Java objects.

Accordingly, an Application Program Interface (API) 505 is provided to furnish the Java code 503 with an object-oriented interface to the functionality of the relational database server 513. Calls to the API 505 from the Java code 503 use objects and methods as in Java and are processed by routines in a Java Database Connectivity (JDBC) driver 507 to form appropriate SQL statements. For example, the JDBC driver 507 is responsible for opening a connection over the network to the database server 513, formulating SQL statements for submission to the database server 513, and returning result sets back to the application executing the Java code 503.

Although the JDBC driver 507 presents a convenient interface to the relational database server 513 from a programming perspective, the JDBC driver 507 nevertheless imposes a performance penalty by its overhead in creating Java objects and in round-trip network communications. Because performance is vital to users, there is a need for improving the performance of web-based database applications without losing the convenience provided by encapsulating the manipulation of relational database statements in a driver.

SUMMARY OF THE INVENTION

The present invention stems from the realization that one source of overhead in processing database statements in the driver is involved in precompiling or "preparing" SQL statements for submission to the relational database server. Specifically, precompilation of a SQL statement involves parsing the SQL statement to identify such metadata as database columns and bind memory, allocating memory for the metadata and also space to store the results of the statement. Accordingly, the present invention addresses the needs of improved performance and convenience by providing a statement cache in the driver, within which at least one precompiled statement is saved. When the application code instantiates another precompiled statement that has the same text, the previously saved version of the precompiled statement is fetched from the cache, without having to incur the overhead in reparsing the SQL statement. Furthermore, a convenient implicit caching model is provided so that the only change that need be made to the application code is a single statement to enable the cache.

One aspect of the present invention relates to a method and software for processing a database statement submitted by a client application to a database system. In this aspect, a database statement is precompiled based on a string received from the client application and cached in response to a call from the client application to close the precompiled database statement. The caching may be implicit or explicit or a combination of both implicit and explicit. With implicit caching, the precompiled statement is saved in a cache in association with the string used to precompile the database statement; with explicit caching, the precompiled statement is saved in a cache in association with a user specified key.

Another aspect of the present invention pertains to a method of processing a database statement in a driver for interfacing calls received from a client application and submitted to a database system, in which a cache is allocated in association with a connection to the database system. In response to a call from the client application to close a prepared database statement, storing the prepared database statement in the cache. In various embodiments, the connection may be a physical login database session or a pooled connection on a single database session.

Yet another aspect of the present invention involves a method for processing a database statement submitted by a client application for a database system, by allocating a cache in association with a connection to the database system; parsing the database statement based on a string received from the client application to generate a cursor and metadata; and in response to a call from the client application to close the database statement, storing the cursor and metadata in the cache in association with the string.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for processing a database statement are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Statement Cache Architecture

Figure 1:
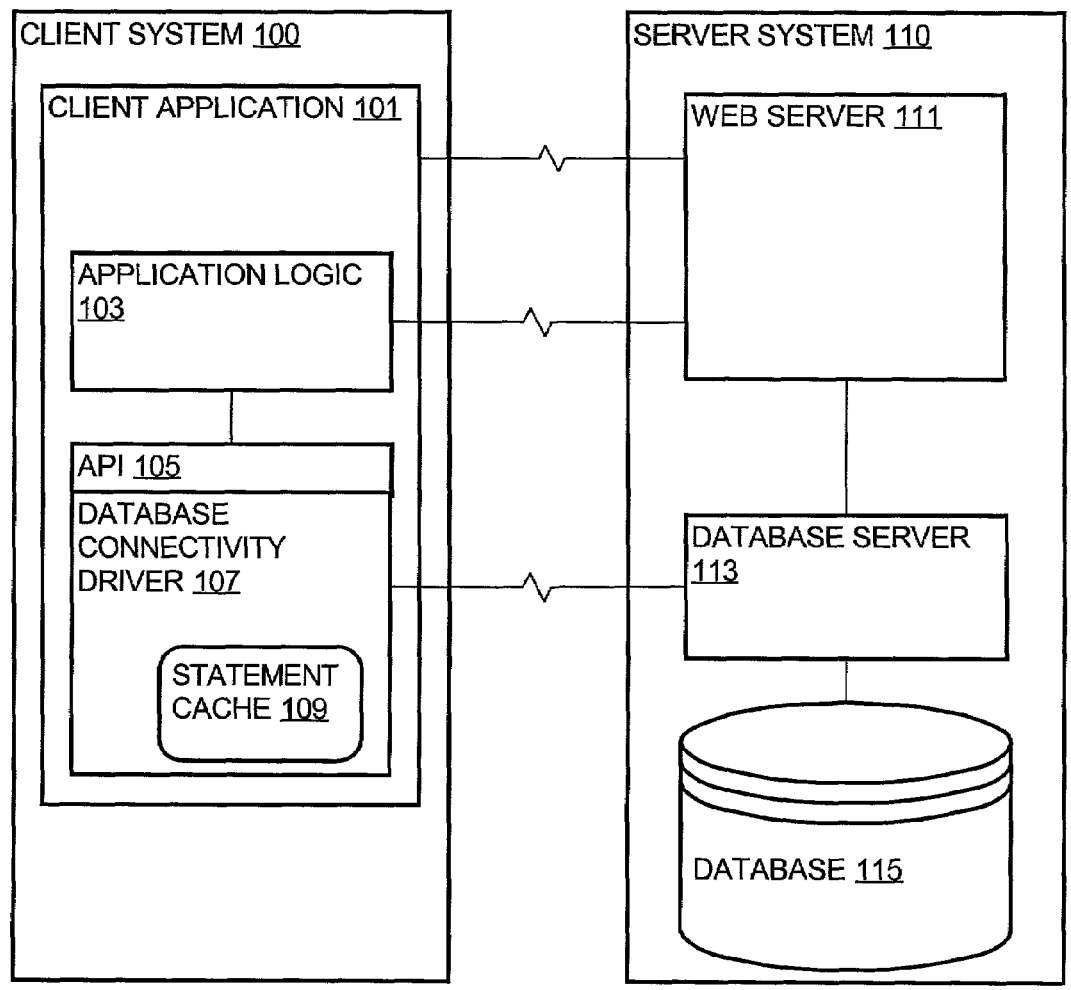
FIG. 1 illustrates an architecture of an embodiment of the present invention.

FIG. 1 illustrates a client-server architecture of a web-based application in accordance with an embodiment of the present invention. Specifically, execution of the web-based database application is distributed among a client system 100 and a server system 110 interconnected by a network such as the global packet switching network commonly known as the Internet. In this configuration, a client application 101, which could be a web browser, executes at the client system 100 for presenting a user-interface for the web-based database application and enabling communications with a web server 111 executing on the server system 110 in accordance with the Hypertext Transfer Protocol (HTTP). A same or different server system 110 may also host a relational database 115, which organizes information into tables of rows and columns. A relational database server 113 is provided to receive database commands and statements that request data, e.g. in the Structured Query Language (SQL) and fetch the requested data from the tables in the relational database 115. The client application 101 can also download application logic 103 from the web server 111 such as bytecodes compiled from a Java program. The application logic 103 can be executed from within the client application 101 to implement the desired functions of the web-based application.

An Application Program Interface (API) 105 is provided to furnish the application logic 103 with an object-oriented interface to the functionality of the relational database server 113. Calls to the API 105 from the application logic 103 use objects and methods and are processed by routines in a database connectivity driver 107 to form appropriate SQL statements. For example, the driver 107 is responsible for opening a connection over the network to the database server 113, formulating SQL statements for submission to the database server 113, and returning result sets back to the application executing the application logic 103.

In one embodiment of the present invention, the driver 107 includes a statement cache 109, which is a region of memory that is allocated to hold precompiled database statements. The memory allocated for the cache is sufficient to hold at least a handle, pointer, or other reference for each prepared statement in the statement cache 109.

Two kinds of statement caching is described herein: implicit and explicit. Implicit statement caching allows the application to benefit from statement caching while requiring a minimum of changes to the application code. On the other hand, explicit statement caching is more flexible and provides the application programmer with greater control and power, but also requires more changes the application code than what implicit statement caching requires. In a preferred embodiment, both types of statement caching are available to the programmer in the same application.

Implicit Statement Caching

Figure 2:
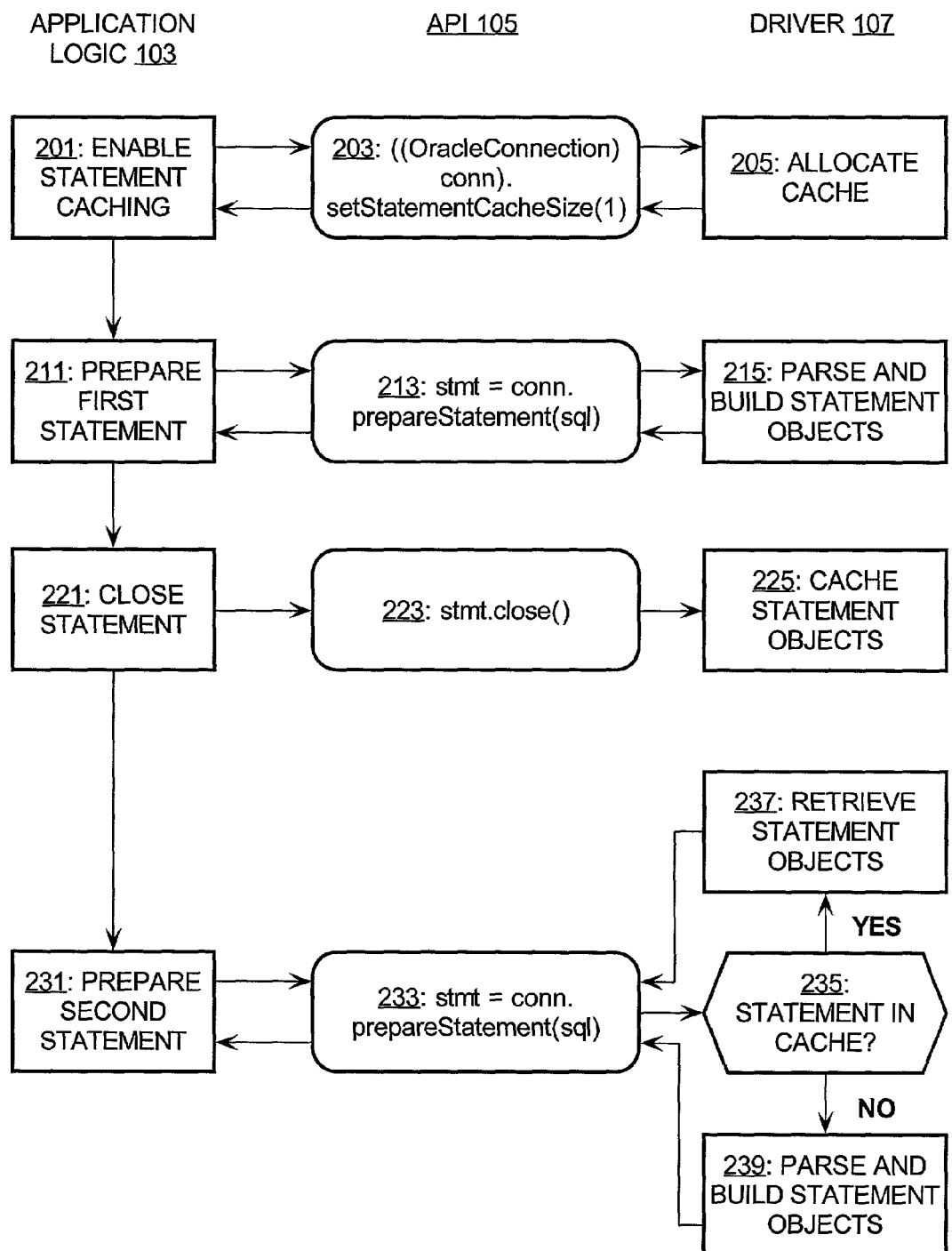
FIG. 2 illustrates the operation of implicit statement caching in accordance with one embodiment of the present invention.

The operation of implicit statement caching is shown in FIG. 2, which involves operations performed by the client system 110 by executing code in the application logic 103 and the database connectivity driver 107 via API 105 calls. Implicit statement caching allows for prepared statements to be cached automatically when the prepared statement is closed. The only necessary change to application code with implicit statement caching is to enable statement caching at the beginning of the application, which may require only one line of code to add. Accordingly, implicit statement caching allows for applications to immediately benefit from statement caching with only a minimum of change to the user source code.

At step 201, statement caching is enabled by making an API call 203 to set the size of the statement cache 109 to a number greater than zero. In one embodiment, the API call 203 is made on a subtype of the JDBC 507 Connection type that is specialized to maintain the statement cache 109. For example, the specialized Connection subtype extends the interface of the JDBC 507 Connection type to include a "setStatementCacheSize" method, so that the API call 203 would be: "((OracleConnection) conn).setStatementCacheSize(1)" where "OracleConnection" is the name of the specialized Connection type, and the "setStatementCacheSize(1)" method call requests the OracleConnection object to set a statement cache size of one (1). The specialized Connection subtype may implement a statement cache 109 for a user connection, e.g. a login session to the database server 113 for a specific user, or for a pooled connection, which allows several users to share a single session with the database server 113 using a pre-specified login identifier.

In response, the driver 107, allocates a statement cache 109 of the given size. In the example, the argument to the API call 203 was one, so the driver 107 allocates a statement cache 109 that can hold one cache statement. Optionally, a cache size of zero (0) would disable statement caching.

Later in the execution application logic 103, a SQL statement is prepared or precompiled (step 211), by making an API call 213 from the application logic 103. In the illustrated embodiment, the API call 213 to prepare a statement is "stmt=conn.prepareStatement(sq1)" where "conn" is the connection object, and "sq1" is a string containing a SQL statement, command, or query. Preferably, this API call 213 is identical in form to a JDBC driver 507 call in order to minimize the number of changes to users' code. Another JDBC API call that can be used here is a "prepareCall( )" call.

A prepared statement is an object that represents a precompiled SQL statement. The internal details of a precompiled SQL statement are implementation-dependent, but the present invention is not limited to any particular implementation. Generally, a precompiled SQL statement has been parsed (by the driver 107 in step 215) to identify the database columns and bind variables that have been specified in the string. This information is stored as metadata. A precompiled statement may also include space for storing the result set of executing a SQL query. This space is referred to as a cursor. In one embodiment, the implicit statement caching saves only the structure of the cursor, not the contents of the result set, but explicit statement caching, as described in greater detail hereinafter, does save the result set in addition to the cursor structure.

After a SQL statement has been prepared, the application logic 103 may use the prepared statement in various ways (not shown), including assigning values for bind variables in the prepared statement, executing the prepared statement to obtain a result set, and iterating through the result set to obtain the result from each row of data that was retrieved. For example, executing a prepared statement involves a communication from the driver 107 to the database server 113 over the connection, and retrieving the result set involves a communication from the database server 113 to the driver 107 over the connection.

When the application logic 103 is finished with the prepared statement (step 221), an API call 223 is invoked to close the statement (e.g. "stmt.close( )"). Previously, closing a statement in JBDC resulted in releasing to the system all the memory and other resources held by the prepared statement object, but, in one embodiment of the present invention, the "close" API call 223 saves the prepared statement object in the statement cache 109 instead (step 225) in association with the string that was used to prepare the statement. This step may involve saving the metadata obtained by parsing the statement. If there is not enough room in the statement cache 109, one of the previously cached statements is removed from the cache, e.g. using a Least Recently Used (LRU) policy, to make room for the new cached statement. With implicit statement caching in accordance with an embodiment of the invention, the result set need not be cached along with the metadata of the prepared statement.

The benefits of statement caching manifests when the application logic 103 prepares a second statement (step 231) by making an API call 233 with the same string that was used to prepare one of the cached statements. For example, one JDBC API call can be "stmt=conn.prepareStatement (sq1)", and another method in the JDBC API that can be used is "prepareCall( )". At step 235, the driver 107 checks the SQL string that was passed in during the API call 233 to determine if a prepared statement was saved in the statement cache 109 in association with that string. If that prepared statement can be found, then at step 237 the statement objects associated with the prepared statement (e.g. the metadata and cursor) are retrieved from the statement cache 109 and used to instantiate the prepared statement object.

If, on the other hand, no prepared statement can be found in the statement cache 109 associated with the SQL string passed in through the API call 223, then the SQL string is parsed and used to build the statement objects, including metadata and a cursor. When the prepared statement is retrieved from the statement cache 109 (in execution path 237), execution of the driver 107 code advantageously avoids the overhead in execution path 239 associated with reparsing the SQL string and reinstantiating the metadata and cursor for the prepared statement.

Explicit Statement Caching

Explicit statement caching allows for finer application programmer control over the caching of prepared statements. This not only involves changes in the application logic 103 to enable statement caching at the beginning, but to specify an explicit key that is associated with a specific prepared statement. Furthermore, explicit statement caching provides additional power over implicit statement caching because the state of the prepared statement, e.g. the result sets, are saved in addition to the structure of the prepared statement (e.g. metadata and cursor).

Figure 3:
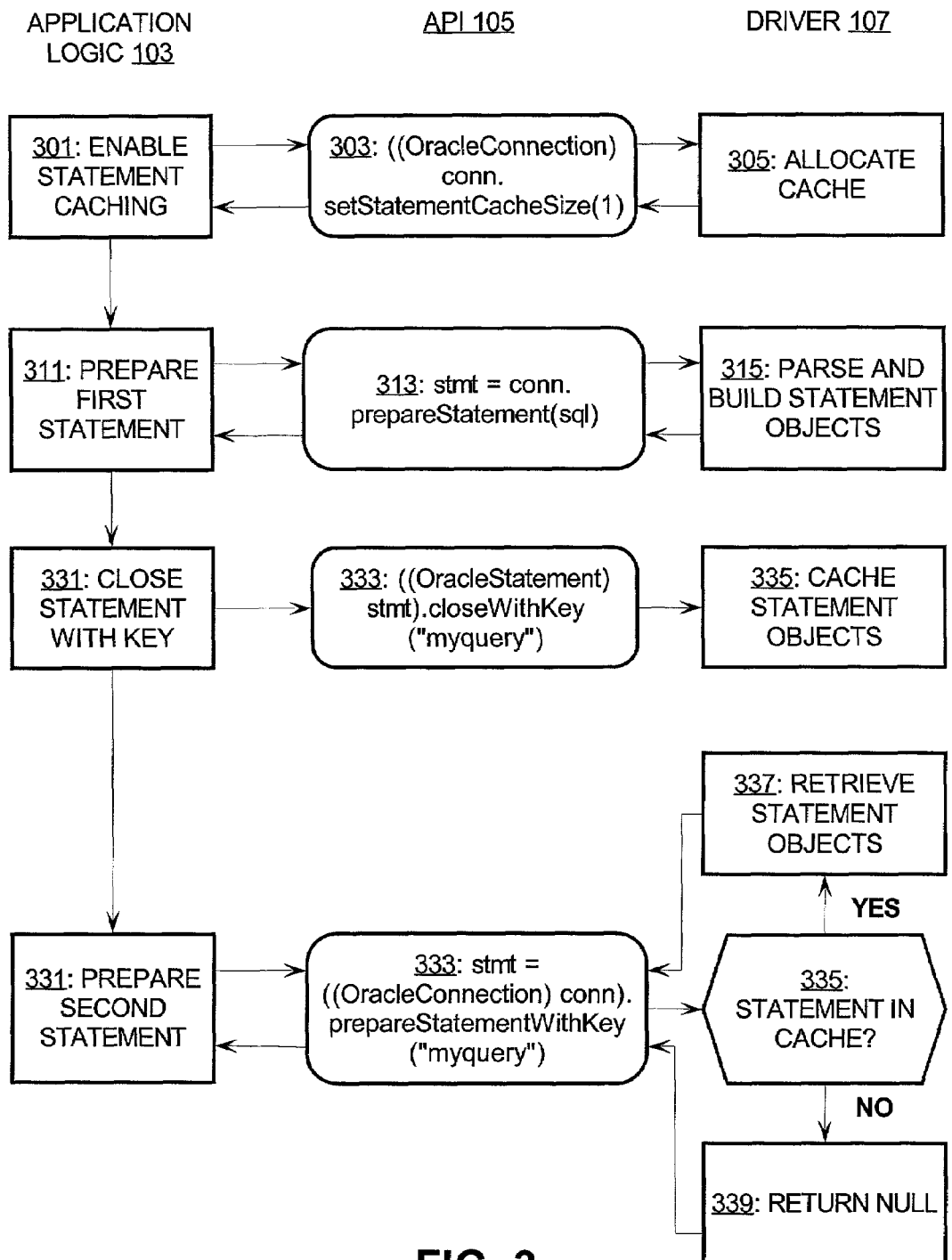
FIG. 3 illustrates the operation of explicit statement caching in accordance with one embodiment of the present invention.

The operation of explicit statement caching is illustrated in FIG. 3. At step 301, statement caching is enabled by making an API call 303 to set the statement cache size to a number greater than zero. In one embodiment, the API call 303 is made on a subtype of the JDBC 507 Connection type that was specialized to contain the statement cache, as described above in connection with API call 203. In response, the driver 107, allocates a statement cache 109 of the given size. The memory allocated for the statement cache 109 is sufficient to hold at least a handle, pointer, or other reference for each of the specified number of prepared statements. Optionally, a cache size of zero (0) would disable statement caching.

When, later in the execution application logic 103, a SQL statement is prepared or precompiled (step 311), an API call 313 is made from the application logic 103. In the illustrated embodiment, the API call 313 to prepare a statement is "stmt=conn.prepareStatement(sq1)". Preferably, this API call 313 is identical in form to a JDBC driver 507 call in order to minimize the number of changes to users' code. In addition, the "createStatement( )" and "prepareCall( )" can also be used. The SQL statement specified in the string sq1 of the API call 313 is then precompiled in step 315 as described above in connection with step 215.

After the application logic 103 uses the prepared statement in various ways (not shown), and when the application logic 103 is finished with the prepared statement (step 321), an API call 323 is invoked to close the statement passing an additional parameter as a key (e.g. "((OracleStatement) stmt).closeWithKey("myquery")"), where the cast "(OracleStatement)" indicates the statement is an instance of a subtype of the JDBC Statement type specialized in accordance with an embodiment of the present invention. The specialized Statement subtype has an extended interface for specifying a key when closing a statement. The key is a string that the application logic 103 uses to identify the prepared statement together with its result set. At step 325, the "closeWithKey" API call 323 results in the driver 107 saving the prepared statement object in the statement cache 109 in association with the key. This step can involve saving the metadata obtained by parsing the statement. If there is not enough room in the statement cache 109, one of the previously cached statements is removed from the statement cache 109, e.g. using a Least Recently Used (LRU) policy, to make room for the new cached statement. In addition, the result set can be cached along with the metadata of the prepared statement.

The benefits of statement caching manifests when the application logic 103 prepares a second statement (step 331) by making an API call 233 with the same key that is associated with one of the cached statements. In one embodiment, the call is "stmt=((OracleConnection) conn).prepareStatementWithKey("myquery")", in which the connection object "conn" that has been specialized to include the "prepareStatementWithKey" method interface. In a preferred embodiment, the specialized connection interface is also extend to include the "createStatementWithKey" and the "prepareStatementWithKey" calls.

At step 335, the driver 107 checks the key that was passed in during the API call 333 to determine if a prepared statement was saved in the statement cache 109 in association with that key. If that prepared statement can be found, then at step 337 the statement objects associated with the prepared statement (e.g. the metadata and cursor) are retrieved from the statement cache 109 and used to instantiate the prepared statement object. If, on the other hand, no prepared statement can be found in the statement cache 109 that is associated with a string equal to the SQL string passed in through the API call 323, then an null result is returned to indicate that no prepared statement is currently in the cache for the key. When the prepared statement is retrieved from the cac statement cache 109 he (in execution path 337), execution of the driver 107 code advantageously avoids the overhead associated with reparsing the SQL string and reinstantiating the metadata and cursor for the prepared statement.

Hardware Overview

Figure 4:
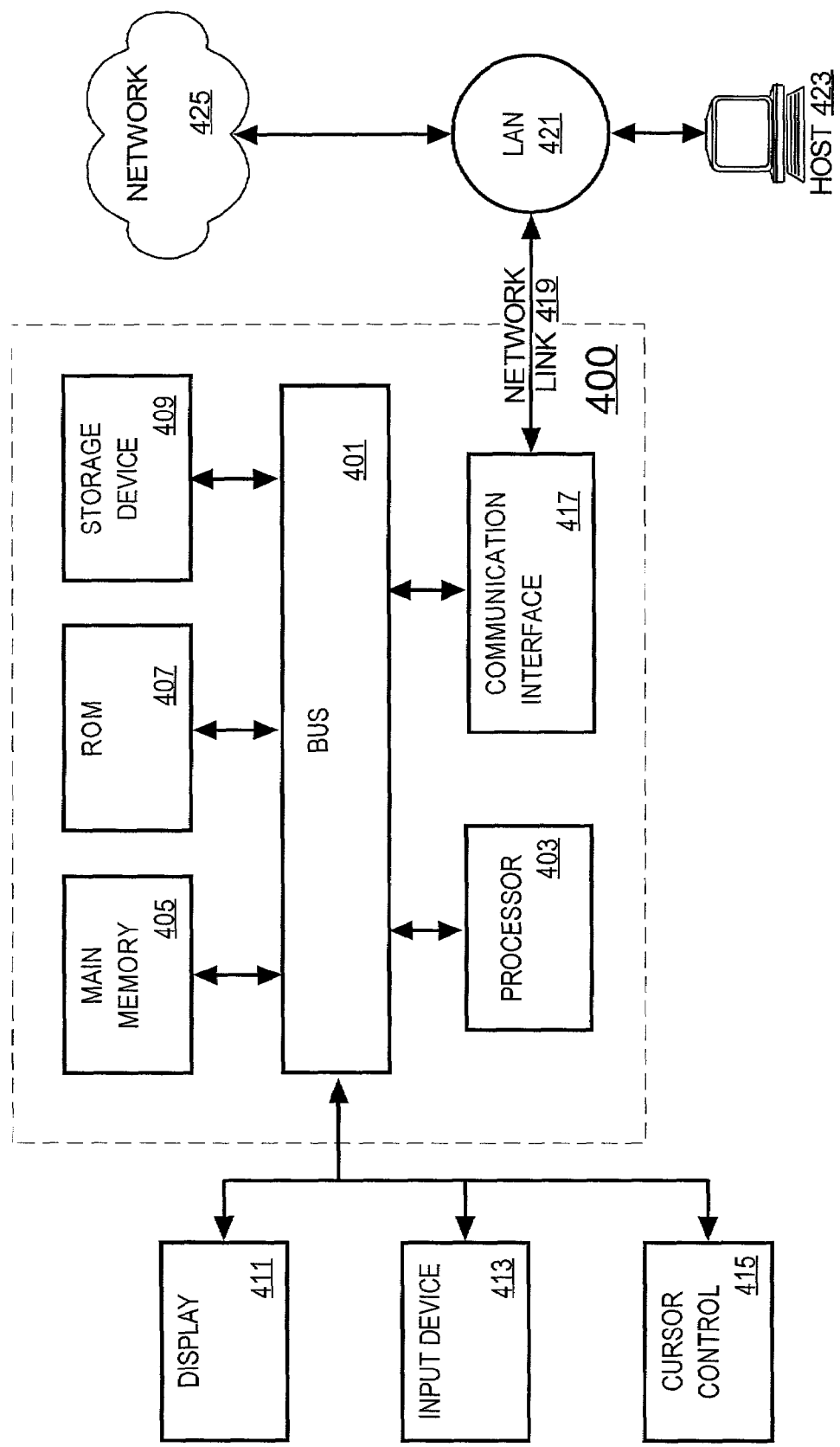
FIG. 4 depicts a computer system that can be used to implement an embodiment of the present invention.
Figure 5:
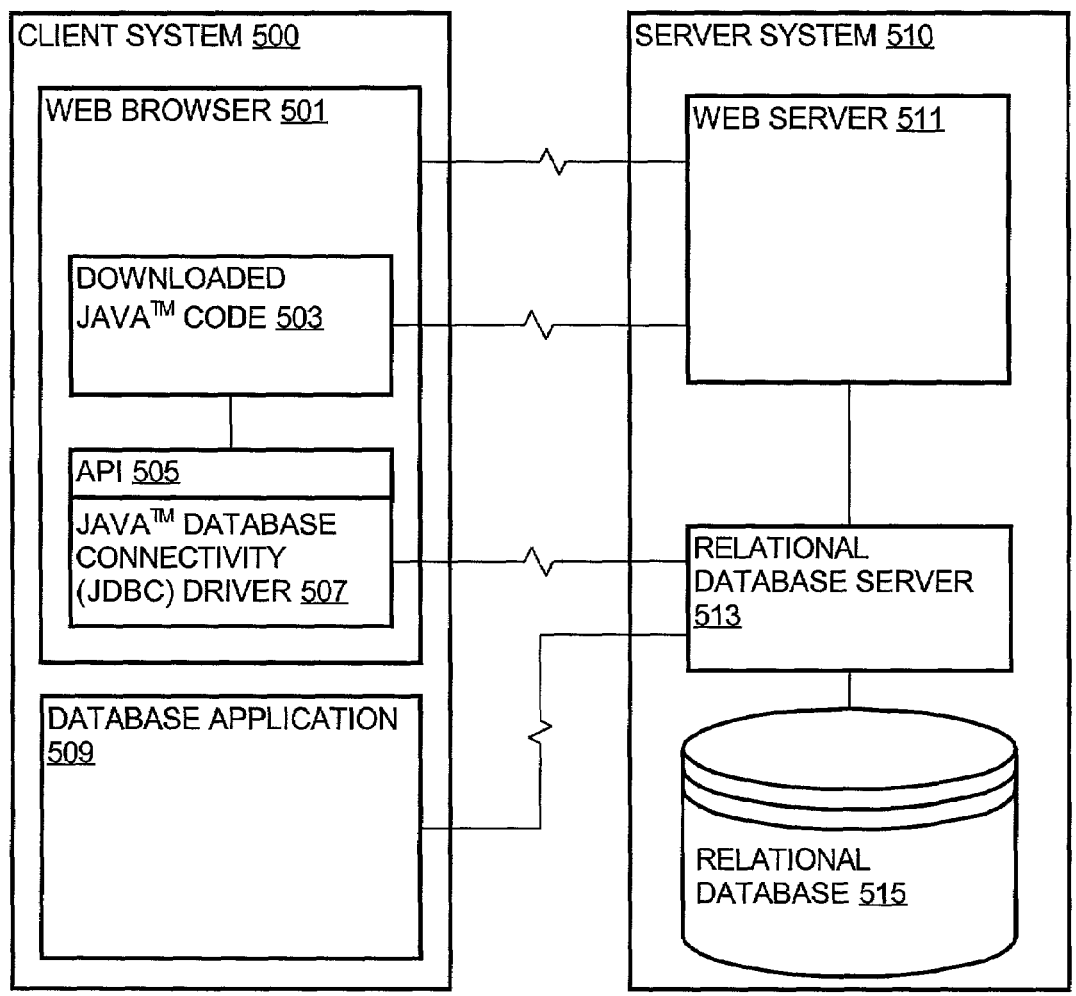
FIG. 5 depicts a client-server database architecture.

FIG. 4 illustrates a computer system 400 upon which an embodiment according to the present invention can be implemented. The computer system 400 includes a bus 401 or other communication mechanism for communicating information and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions by the processor 403. The computer system 400 may further include a read only memory (ROM) 407 or other static storage device coupled to the bus 401 for storing static information and instructions for the processor 403. A storage device 409, such as a magnetic disk or optical disk, is coupled to the bus 401 for persistently storing information and instructions.

The computer system 400 may be coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is a cursor control 415, such as a mouse, a trackball, or cursor direction keys, for communicating direction information and command selections to the processor 403 and for controlling cursor movement on the display 411.

According to one embodiment of the invention, database statement processing is provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the present invention. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, a telephone modem, or any other communication interface to provide a data communication connection to a corresponding type of communication line. As another example, communication interface 417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417 can include peripheral interface devices, such as a Universal Serial Bus (USB) interface, a PCMCIA (Personal Computer Memory Card International Association) interface, etc. Although a single communication interface 417 is depicted in FIG. 4, multiple communication interfaces can also be employed.

The network link 419 typically provides data communication through one or more networks to other data devices. For example, the network link 419 may provide a connection through local network 421 to a host computer 423, which has connectivity to a network 425 (e.g. a wide area network (WAN) or the global packet data communication network now commonly referred to as the "Internet") or to data equipment operated by a service provider. The local network 421 and network 425 both use electrical, electromagnetic, or optical signals to convey information and instructions. The signals through the various networks and the signals on network link 419 and through communication interface 417, which communicate digital data with computer system 400, are exemplary forms of carrier waves bearing the information and instructions.

The computer system 400 can send messages and receive data, including program code, through the network(s), network link 419, and communication interface 417. In the Internet example, a server (not shown) might transmit requested code belonging an application program for implementing an embodiment of the present invention through the network 425, local network 421 and communication interface 417. The processor 403 may execute the transmitted code while being received and/or store the code in storage device 49, or other non-volatile storage for later execution. In this manner, computer system 400 may obtain application code in the form of a carrier wave.

The term "computer-readable medium" as used herein refers to any medium that participates in providing instructions to the processor 405 for execution. Such a medium may take many forms, including but not limited to non-volatile media, volatile media, and transmission media. Non-volatile media include, for example, optical or magnetic disks, such as storage device 409. Volatile media include dynamic memory, such as main memory 405. Transmission media include coaxial cables, copper wire and fiber optics, including the wires that comprise bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A computer-implemented method for processing a database statement submitted by a client application to a database system, comprising:

precompiling a database statement based on a string received from the client application; and caching the precompiled database statement in response to a call from the client application to close the precompiled database statement;

caching the string used to precompile the precompiled database statement in association with the cached precompiled database statement; and in response to a call from the client application to precompile another database statement based upon another string, performing the steps of:

checking whether the string associated with the cached precompiled database statement matches the other string;

if the string associated with the cached precompiled database statement matches the other string, then establishing the cached precompiled database statement as a result of precompiling the other database statement based upon the other string; and if the string associated with the cached precompiled database statement does not match the other string, then precompiling the other database statement based on the other string.

2. A computer-implemented method according to claim 1, wherein:

the call to close the precompiled database statement includes a key; and said caching the precompiled database statement includes caching the precompiled database statement in association with the key.

3. A computer-implemented method according to claim 2, further comprising:

in response to a call from the client application to precompile another database statement based upon the key, establishing the cached precompiled database statement as a result of the call to precompile the other database statement based upon the key.

4. A computer-implemented method according to claim 2, further comprising, in response to a call from the client application to precompile a database statement based upon another key, the steps of:

checking whether the key associated with the cached precompiled database statement matches the other key;

if the key associated with the cached precompiled database statement matches the other key, then establishing the cached precompiled database statement as a result of the call to precompile the other database statement based upon the other key; and if the key associated with the cached precompiled database statement does not match the other key, then precompiling the other database statement based on the other key.

5. A computer-implemented method according to claim 1, wherein said caching the precompiled database statement includes:

storing the precompiled database statement in a cache allocated in association with a connection to the database system.

6. A computer-implemented method according to claim 1, wherein said precompiling the database statement includes:

parsing the database statement based on the string received from the client application to generate a cursor and metadata.

7. A computer-readable medium bearing instructions for processing a database statement submitted by a client application to a database system, said instructions being arranged, upon execution thereof, to cause one or more processors to perform the computer-implemented method according to claim 1.

8. A computer-implemented method of processing a database statement in a driver for interfacing calls received from a client application and submitted to a database system, comprising:
   allocating a cache in association with a connection to the database system;
   in response to a call from the client application to close a prepared database statement, storing the prepared database statement in the cache;
   storing a string used to prepare the prepared database statement in the cache in association with the prepared database statement stored in the cache; and
   in response to a call from the client application to prepare another database statement based upon another string, performing the steps of:
      checking whether the string associated with the prepared database statement stored in the cache matches the other string;
      if the string associated with the prepared database statement stored in the cache matches the other string, then establishing the prepared database statement stored in the cache as a result of preparing the other database statement based upon the other string; and
   if the string associated with the prepared database statement stored in the cache does not match the other string, then preparing the other database statement based on the other string.

9. A computer-implemented method according to claim 8, further comprising:
   in response to a call from the client application to prepare a database statement, establishing the cached prepared database statement as a result of the call.

10. A computer-implemented method according to claim 8, wherein:
   the call to close the prepared database statement includes a key; and
   said storing the prepared database statement includes storing the prepared database statement in association with the key.

11. A computer-implemented method according to claim 10, further comprising:
   in response to a call from the client application to prepare another database statement based upon the key, establishing the prepared database statement stored in the cache as a result of preparing the other database statement based upon the key.

12. A computer-implemented method according to claim 10, further comprising, in response to a call from the client application to prepare another database statement based upon another key, the steps of:
   checking whether the key associated with the cached prepared database statement matches the other key;
   if the key associated with the cached prepared database statement matches the other key, then establishing the cached prepared database statement as a result of preparing the other database statement based upon the other key; and
   if the key associated with the cached prepared database statement does not match the other key, then preparing the other database statement based on the other key.

13. A computer-implemented method according to claim 8, wherein said storing the prepared database statement includes:
   storing the prepared database statement in a cache allocated in association with a connection to the database system.

14. A computer-implemented computer-readable medium bearing instructions for processing a database statement, said instructions being arranged, upon execution thereof, to cause one or more processors to perform the method according to claim 8.

15. A computer-implemented method for processing a database statement submitted by a client application for a database system, comprising:
   allocating a cache in association with a connection to the database system;
   parsing the database statement based on a string received from the client application to generate a cursor and metadata;
   in response to a call from the client application to close the database statement, storing the cursor and metadata in the cache in association with the string;
   storing the string used to generate the cursor and metadata in the cache in association with the cursor and metadata; and
   in response to a call from the client application to parse another database statement based upon another string, performing the steps of:
      checking whether the string associated with the cursor and metadata stored in the cache matches the other string;
      if the string associated with the cursor and metadata stored in the cache matches the other string, then establishing the cursor and metadata stored in the cache as a result of parsing the other database statement based upon the other string; and
   if the string associated with the cursor and metadata stored in the cache does not match the other string, then parsing the other database statement based on the other string.

16. A computer-readable medium bearing instructions for processing a database statement, said instructions being arranged, upon execution thereof, to cause one or more processors to perform the computer-implemented method according to claim 15.

* * * * *

UNITED STATES PATENT AND TRADEMARK OFFICE
CERTIFICATE OF CORRECTION

| | |
|---|---|
| PATENT NO. | : 7,024,406 B1 |
| APPLICATION NO. | : 10/153642 |
| DATED | : April 4, 2006 |
| INVENTOR(S) | : Kunisetty et al. |

It is certified that error appears in the above-identified patent and that said Letters Patent is hereby corrected as shown below:

Column 12, line 15, between "a" and "computer-readable", delete "computer-implemented"

Column 12, line 18, between "the" and "method", insert --computer-implemented--

Signed and Sealed this

Seventeenth Day of October, 2006

JON W. DUDAS
*Director of the United States Patent and Trademark Office*